(12) United States Patent
Do et al.

(10) Patent No.: US 9,177,243 B2
(45) Date of Patent: Nov. 3, 2015

(54) PASSIVE RFID TRANSPONDER WITH POWERED ELEMENT

(71) Applicants: Quoc Nam Do, Hamilton (CA); Jonathan Jia Wei Chia, Hamilton (CA)

(72) Inventors: Quoc Nam Do, Hamilton (CA); Jonathan Jia Wei Chia, Hamilton (CA)

(73) Assignee: Overair Proximity Technologies Ltd. (CA)

( * ) Notice: Subject to any disclaimer, the term of this patent is extended or adjusted under 35 U.S.C. 154(b) by 143 days.

(21) Appl. No.: 14/017,288

(22) Filed: Sep. 3, 2013

(65) Prior Publication Data
US 2015/0061833 A1 Mar. 5, 2015

(51) Int. Cl.
| | |
|---|---|
| G08B 5/22 | (2006.01) |
| H04Q 1/30 | (2006.01) |
| G08C 19/16 | (2006.01) |
| G08C 19/12 | (2006.01) |
| G08B 5/00 | (2006.01) |
| H05B 39/00 | (2006.01) |
| H05B 41/00 | (2006.01) |
| G06K 19/077 | (2006.01) |
| G06K 19/07 | (2006.01) |

(52) U.S. Cl.
CPC ...... *G06K 19/07715* (2013.01); *G06K 19/0715* (2013.01); *G06K 19/0723* (2013.01)

(58) Field of Classification Search
CPC .............. G06K 19/0723; G06K 19/07345; G06K 19/07749; G06K 19/0717; G06K 7/10009; G06K 19/0708; G06K 19/07309; G06K 19/07758; G06K 19/086; G06K 7/10316; G06K 7/10336; G06K 7/10346; G06K 7/10356; G06K 19/145; G06K 1/18; G01S 13/758; H01Q 1/2208; H01Q 1/2225; H04B 5/0062; H04B 7/0608
USPC .......................... 340/6.11, 7.61, 12.5–12.54, 340/13.25–13.26, 331–332, 815.45
See application file for complete search history.

(56) References Cited

U.S. PATENT DOCUMENTS

| | | | |
|---|---|---|---|
| 7,518,515 B2 | 4/2009 | Trosper | |
| 7,649,461 B2 * | 1/2010 | Wong et al. | 340/572.1 |
| 7,719,429 B2 * | 5/2010 | Barber et al. | 340/573.2 |
| 7,965,186 B2 | 6/2011 | Downie et al. | |
| 2005/0173543 A1 | 8/2005 | Ruping et al. | |
| 2006/0160488 A1 * | 7/2006 | Sueoka et al. | 455/41.2 |
| 2008/0186178 A1 | 8/2008 | Tuttle et al. | |
| 2008/0211427 A1 * | 9/2008 | Budde et al. | 315/294 |

FOREIGN PATENT DOCUMENTS

WO 2008112169 A1 9/2008

OTHER PUBLICATIONS

Atmel Corporation; "Tag Tuning/RFID"; http://www.atmel.com/Images/doc2055.pdf; last accessed on Feb. 5, 2014.

\* cited by examiner

*Primary Examiner* — Jennifer Mehmood
*Assistant Examiner* — Emily C Terrell
(74) *Attorney, Agent, or Firm* — Steven M. Greenberg; CRGO Law

(57) ABSTRACT

A passive RFID transponder circuit comprises a transducer antenna, a power conditioning unit and an RFID signal module coupled to the transducer antenna and an additional powered element coupled to the transducer antenna in parallel with the power conditioning unit and RFID signal module. The powered element is powered by electrical current from the transducer antenna that bypasses the power conditioning unit and RFID signal module.

16 Claims, 10 Drawing Sheets

PASSIVE RFID TRANSPONDER WITH POWERED ELEMENT

TECHNICAL FIELD

The present invention relates to radiofrequency identification (RFID) communications, and more particularly to passive RFID transponders.

BACKGROUND

Radiofrequency identification (RFID) is well known, and uses radiofrequency (RF) electromagnetic fields to transfer data wirelessly and without physical contact. An RFID tag will include a power conditioning unit and an RFID signal module, typically as a single integrated circuit, and a transducer antenna coupled to the RFID signal module and power conditioning unit. In a passive RFID transponder tag, a reader device will transmit a radiofrequency (RF) signal to the tag, where it is received by the transducer antenna and converted by the transducer antenna into an electrical current which is conditioned by the power conditioning unit to power the RFID signal module. The RFID signal module generates a data-carrying electrical signal and the transducer antenna receives the data-carrying electrical signal from the RFID signal module and converts the data-carrying electrical signal into an outgoing data-carrying RF signal that can be received and decoded by the reader device. Thus, in a passive RFID transponder the transducer antenna both collects power from the incoming RF signal and transmits the outgoing RF signal. As such, a passive RFID transponder does not need a separate power source, since it uses the current induced in the transducer antenna by the RF signal from the reader device.

SUMMARY

A passive RFID transponder includes not only an RFID signal module and power conditioning unit but also at least one additional component that is also powered by the transducer antenna in parallel with the RFID signal module.

In one aspect, a passive RFID transponder circuit comprises a transducer antenna, an RFID signal module, a power conditioning unit and a powered element. The transducer antenna is adapted to receive incoming RF signals and convert the incoming RF signals into electrical current, and is further adapted to receive a data-carrying electrical signal and convert the data-carrying electrical signal into an outgoing data-carrying RF signal. The RFID signal module is coupled to the transducer antenna in an electrical circuit therewith, and the power conditioning unit is interposed in the electrical circuit between the transducer antenna and the RFID signal module and configured to receive electrical current from the transducer antenna and deliver conditioned electrical current to the RFID signal module. The RFID signal module is arranged to receive the conditioned electrical current from the power conditioning unit and is adapted to respond to receiving the conditioned electrical current by transmitting the data-carrying electrical signal to the transducer antenna. The powered element is coupled to the transducer antenna in parallel with the RFID signal module and the power conditioning unit. The RFID transponder circuit is configured so that the powered element receives electrical current from the transducer antenna for powering the powered element, and the flow of electrical current from the transducer antenna to the powered element bypasses the RFID signal module and the power conditioning unit.

The powered element may comprise a light source or switch, and may be coupled to the transducer antenna in parallel with the RFID signal module.

In some embodiments where the powered element comprises a light source, a pulse controller may be interposed in the electrical circuit between the transducer antenna and the light source, with the pulse controller configured so that electrical current from the transducer antenna is stored by the pulse controller without reaching the light sources and then sent by the pulse controller to the light source(s) to pulse the light source(s). One or more resistor(s) may be interposed in the electrical circuit between the transducer antenna and the light source(s).

In one embodiment, the passive RFID circuit is part of a near field communication tag and the transducer antenna is tuned to a frequency of 13.56 MHz.

Where the powered element comprises a light source, the light source may be embedded in an optical carrying medium, which may be translucent for dispersing light, or the light source may communicate with one or more optical fibers for transmitting light from the light source to another location.

In another aspect, a method for powering a powered element comprises receiving an RF signal at a transducer antenna, the transducer antenna converting the RF signal to an electrical current, and directing the electrical current through a power conditioning unit coupled to the transducer antenna and then through an RFID signal module coupled to the transducer antenna and also through at least one powered element coupled to the transducer antenna. The powered element(s) are coupled to the transducer antenna in parallel with the power conditioning unit and the RFID signal module, and the flow of electrical current from the transducer antenna to the powered element bypasses the RFID signal module and the power conditioning unit. The transducer antenna, the at least one powered element, the power conditioning unit and the RFID signal module all form part of a passive RFID transponder.

In yet another aspect, a method for indicating receipt of an RF signal by a passive RFID transponder comprises receiving an RF signal at a transducer antenna, the transducer antenna converting the RF signal to an electrical current, directing the electrical current through a power conditioning unit coupled to the transducer antenna and then through an RFID signal module coupled to the transducer antenna to generate a data-carrying electrical signal and deliver the data-carrying electrical signal to the transducer antenna, and directing the electrical current through at least one powered indicator coupled to the transducer antenna to generate an indicator signal. The electrical current through the power conditioning unit and the RFID signal module flows in parallel with the electrical current through the at least one powered indicator, and the flow of electrical current from the transducer antenna to the powered element bypasses the RFID signal module and the power conditioning unit.

BRIEF DESCRIPTION OF THE DRAWINGS

These and other features of the invention will become more apparent from the following description in which reference is made to the appended drawings wherein.

DETAILED DESCRIPTION

Figure 1:
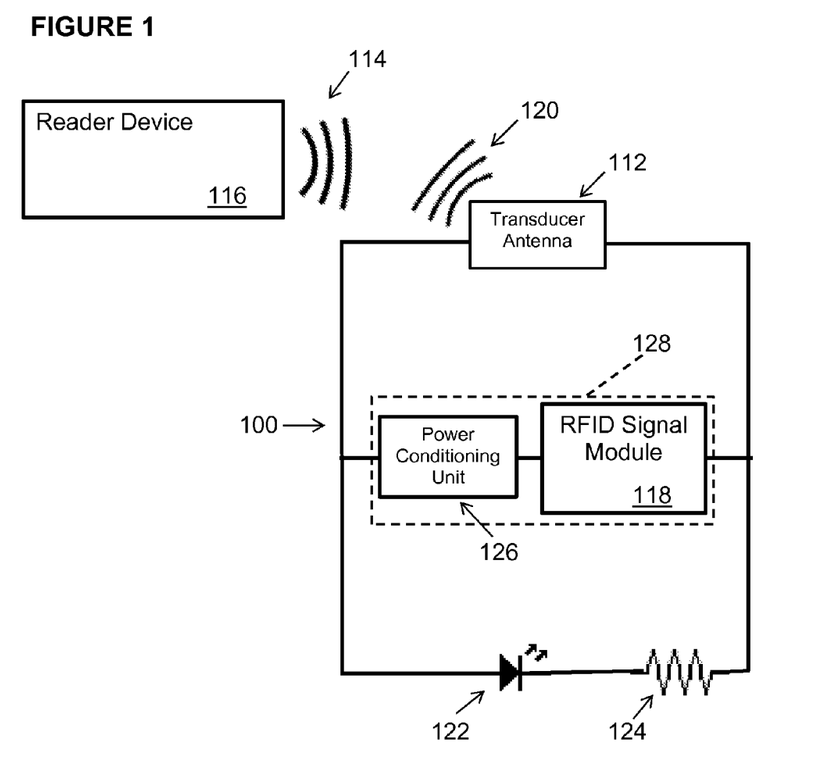
FIG. 1 shows a first exemplary passive RFID transponder circuit.

Reference is now made to FIG. 1, in which a first exemplary passive RFID transponder circuit is indicated generally by reference numeral 100. The passive RFID transponder circuit 100 comprises a transducer antenna 112 for receiving incoming RF signals 114 at a suitable frequency from a reader device 116 and converting the incoming RF signals 114 into electrical current, and an RFID signal module 118 and power conditioning unit 126 coupled to the transducer antenna 112 in electrical circuit therewith.

The power conditioning unit 126 is interposed in the electrical circuit between the transducer antenna 112 and the RFID signal module 118, and is configured to receive electrical current from the transducer antenna 112, condition the electrical current so received, and deliver the conditioned electrical current to the RFID signal module 118. For example, the power conditioning unit 126 may comprise a rectifier and a limiter. The power conditioning unit 126 merely conditions the electrical current received from the transducer antenna 112, and does not contain any independent power source, nor is it coupled to any independent power source—the power conditioning unit 126 receives power only from the transducer antenna 112. The RFID signal module 118 is arranged to receive the conditioned electrical current from the power conditioning module 126 and is adapted to respond to receiving the conditioned electrical current by transmitting a data-carrying electrical signal to the transducer antenna 112. The RFID signal module 118 will typically include components for information storage and processing, such as signal modulation and demodulation. Typically, the power conditioning unit 126 and the RFID signal module 118 form part of a single integrated circuit 128. The integrated circuit 128 may be, for example, a MIFARE Ultralight chip offered by NXP Semiconductors N.V., having an address at 411 E. Plumeria Drive, San Jose, Calif. 95134, U.S.A. Alternatively, the power conditioning unit 126 and the RFID signal module 118 may be separate and may each comprise an individual integrated circuit. The transducer antenna may be, for example, an E-Unit antenna offered by SES RFID Solutions having an address at Angermunder StraBe 19, 40489 Dusseldorf, Germany. A transducer antenna may be a suitably coiled length of conductive material such as copper, and may include a capacitor connected in parallel between portions of the coiled material to tune the transducer antenna to a desired frequency. Such a capacitor may be a tuning capacitor whose capacitance can be adjusted to selectively tune the transducer antenna, or may have a fixed capacitance for tuning the transducer antenna to a fixed frequency. Alternatively, a capacitor for tuning the transducer antenna may form part of the RFID signal module. Suitable designs for transducer antennae, power conditioning units and RFID signal modules for use in RFID applications are well-known in the art and are not discussed further.

When the incoming RF signals 114 are received by the transducer antenna 112, the power conditioning unit 126 receives unconditioned electrical current from the transducer antenna 112 and transmits conditioned electrical current to the RFID signal module 118, which receives the conditioned electrical current and generates a data-carrying electrical signal, typically embodying data stored on the RFID signal module 118, such as an identification number. The transducer antenna 112 receives the data-carrying electrical signal from the RFID signal module 118 and converts the data-carrying electrical signal into outgoing data-carrying RF signals 120 that can be read by the reader device 116.

The exemplary passive RFID transponder circuit 100 further comprises a powered element coupled to the transducer antenna 112 in the passive RFID transponder circuit 100 in parallel with the power conditioning unit 126 and the RFID signal module 118. The passive RFID transponder circuit 100 is configured so that the powered element receives electrical current from the transducer antenna 112; this current powers the powered element.

As used herein, the term "powered element" refers to a component or a group of components arranged in a circuit to perform a specified function using only the current received from the transducer antenna to perform that function. The term "powered element", as used herein comprises two subclasses: "active powered elements" and "storage powered elements". An "active powered element" is an element which uses current from the transducer antenna for some function other than storage, for example illumination or switching, whereas a "storage powered element" merely stores energy for later use by some other component. Capacitors and batteries are storage powered elements, and could be used to store energy to enable an RFID transponder circuit to continue transmitting outgoing data-carrying RF signals for a period of time after discontinuance of incoming RF signals. For example, in a battery-assisted passive RFID circuit, the battery may be a rechargeable battery that recharges using current received from the transducer antenna. Note that an "active powered element" may include storage components such as capacitors as part of its circuitry while still being an "active powered element" rather than a "storage powered element".

In the exemplary embodiment shown in FIG. 1, the powered element is a light source in the form of a light emitting diode (LED) 122; other types of powered element may also be used; examples are described further below. As can be seen from FIG. 1, the LED 122 is coupled to the transducer antenna 112 in parallel with the RFID signal module 118 and the power conditioning unit 126. Due to this parallel coupling, the flow of unconditioned electrical current from the transducer antenna 112 to the LED 122 bypasses the RFID signal module 118 and the power conditioning unit 126. At least one resistor 124 may be interposed in the electrical circuit between the transducer antenna 112 and the LED 122. The LED 122 will be illuminated when it receives current from the transducer antenna 112, providing a visible indication that the incoming RF signals 114 from the reader device 116 have been received by the transducer antenna 112. The LED may be, for example, a NexxTech brand 5 mm red 2.0V LED (product number 2760209) or a NexxTech brand 3 mm red 2.25V red LED (product number 2760026), both offered by The Source, having a postal address at 279 Bayview Drive, Barrie, Ontario L4M 4W5 Canada and permitting online purchases at the Internet website: http://www.thesource.ca/estore/default.aspx?language=en-CA.

Figure 2:
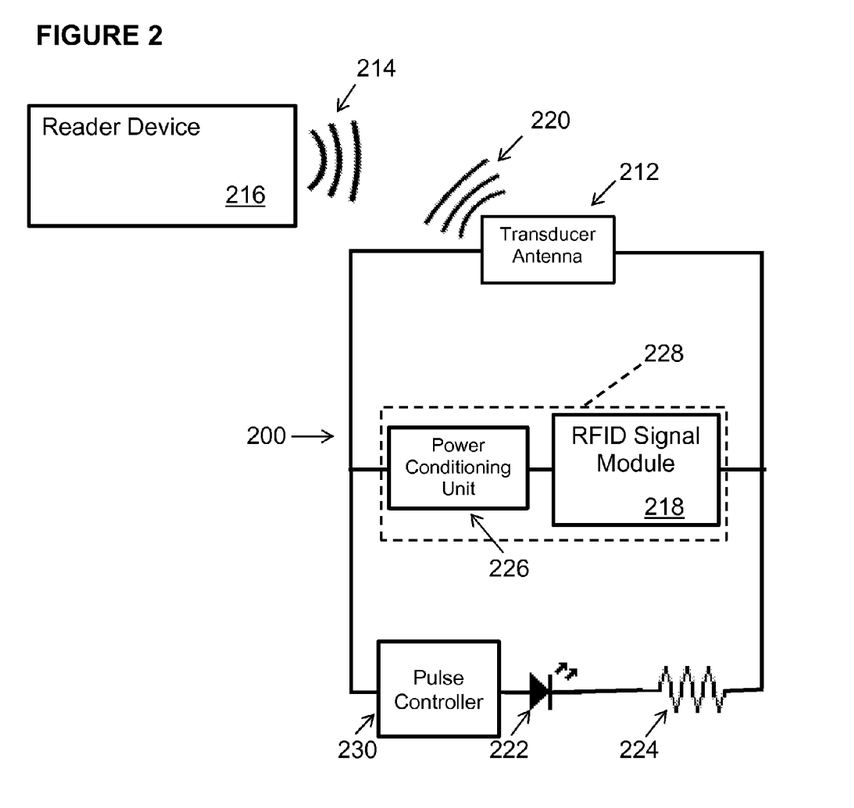
FIG. 2 shows a second exemplary passive RFID transponder circuit.

FIG. 2 shows a second exemplary passive RFID transponder circuit, indicated generally at 200. The second passive RFID transponder circuit 200 is similar to the first passive RFID transponder circuit 100, with like reference numerals denoting like features except with the prefix "2" instead of "1". In the second passive RFID transponder circuit 200, a pulse controller 230 is interposed in the electrical circuit between the transducer antenna 212 and the LED 222. In this configuration, electrical current from the transducer antenna 212 bypasses the RFID signal module 218 and the power conditioning unit 226 and is intercepted and stored by the pulse controller 230 without reaching the LED 222. The stored current is then sent by the pulse controller 230 to the LED 222 to pulse the LED 222. The pulse controller 230 may include AC-DC rectification circuitry, one or more capacitors for storing a charge, and a switch for controlling discharge of the capacitor(s). Design of suitable pulse controllers is within the capability of one skilled in the art, now informed by the herein disclosure, and is not described further. In an alternate embodiment, the powered element may be an LED unit that includes an integrated pulse controller (i.e. a flashing LED).

Figure 3:
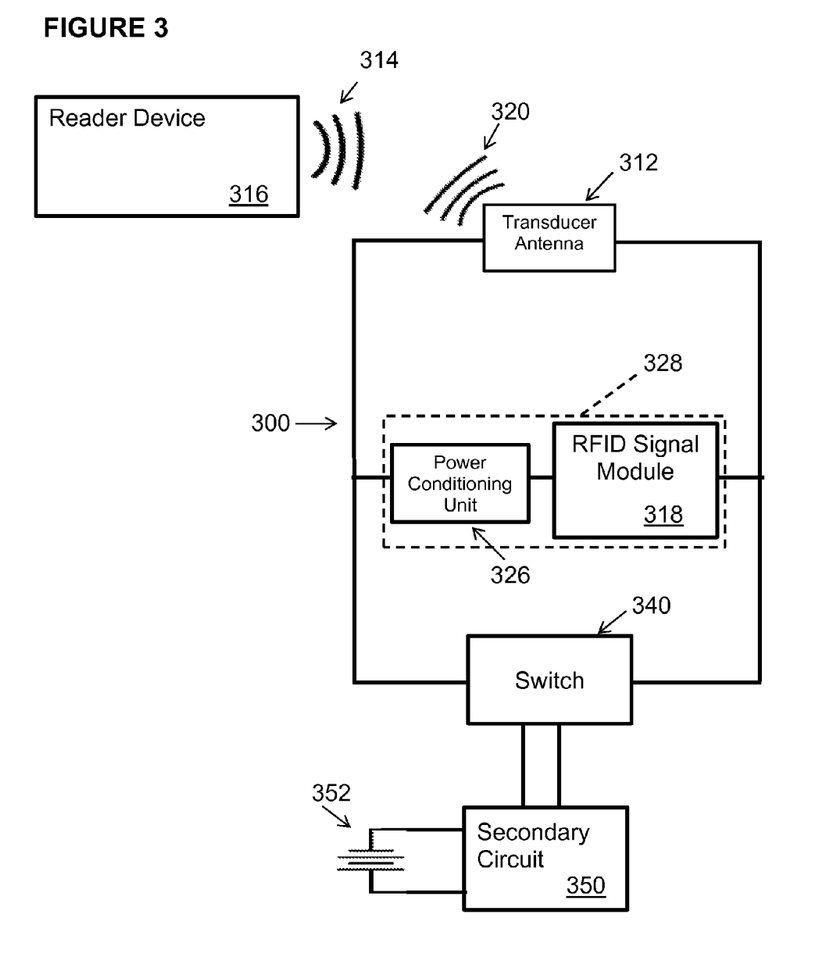
FIG. 3 shows a third exemplary passive RFID transponder circuit.

Reference is now made to FIG. 3, which shows a third exemplary passive RFID transponder circuit 300. The third passive RFID transponder circuit 300 is similar to the first passive RFID transponder circuit 100, and like reference numerals denote like features except with the prefix "3" instead of "1". In the third passive RFID transponder circuit 300, the powered element is a switch 340 instead of an LED. The switch 340 forms part of a secondary circuit 350, and will either open or close in response to voltage received from the transducer antenna 312, thereby controlling functionality of the secondary circuit 350. The switch 340 may comprise, for example, a rectifier and a transistor. Moreover, in certain embodiments, the switch 340 may comprise a first component that is part of the RFID transponder circuit 300 and a second component that is part of the secondary circuit 350, with the first and second components being electrically remote from one another. For example, the switch 340 may comprise an LED forming part of the RFID transponder circuit 300 and a photocell forming part of the secondary circuit 350 and positioned to receive light from the LED. Design of suitable switches is within the capability of one skilled in the art, now informed by the herein disclosure, and is not described further.

The secondary circuit 350 will generally include its own power supply 352, separate and distinct from the transducer antenna 312, so that the secondary circuit 350 is powered entirely by its own power supply 352; the voltage from the transducer antenna 312 will be used only as a signal to control the switch 340 and not to power the secondary circuit 350. The secondary circuit 350 may perform any suitable function. By way of example and not limitation, the secondary circuit 350 may comprise one or more light sources or an audio circuit for playing a desired sound, or may comprise a more complicated system such as a video display system including data storage and a video display screen. Such a system could present a stored video on the video display screen when the switch 340 receives voltage from the transducer antenna 312.

As can be seen in FIGS. 1 to 3, whether the powered element is a light source such as an LED 122, 222, a switch 340 or some other component or combination of components, the powered element is powered entirely by electrical current received from the transducer antenna 112, 212, 312. In the case of the switch 340, although current from the power supply 352 of the secondary circuit 350 may flow through the switch 340, the switch is only powered, that is, driven open or closed, by current received from the transducer antenna 312. For example, where the switch 340 comprises an LED forming part of the RFID transponder circuit 300 and a photocell forming part of the secondary circuit 350, there is no electrical communication between the LED and the photocell—only optical communication. Nonetheless, the two components together may function as a powered switch to control all or part of the secondary circuit 340. Thus, the exemplary passive RFID transponder circuits 100, 200, 300 shown in FIGS. 1 to 3 each enable a method for powering a powered element.

Figure 4:
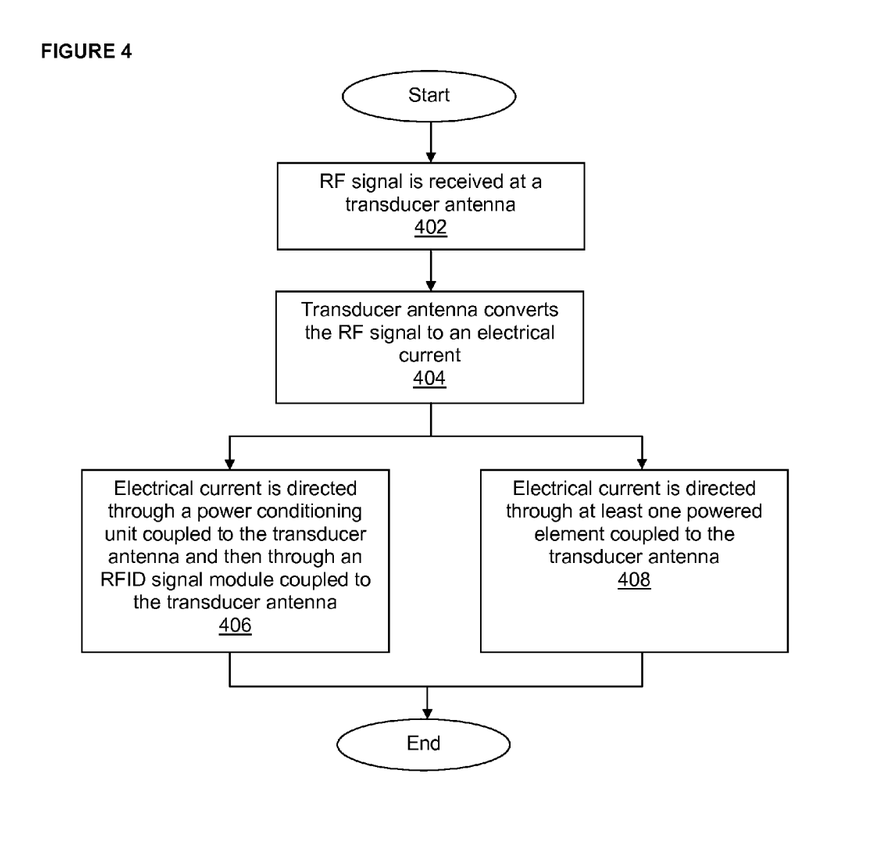
FIG. 4 is a flow chart showing an exemplary method for powering a powered element.

Referring now to FIG. 4, an exemplary method 400 for powering a powered element is shown in flow chart form. At step 402, an RF signal is received at a transducer antenna and at step 404 the transducer antenna converts the RF signal to an electrical current. At step 406 the electrical current is directed through a power conditioning unit coupled to the transducer antenna and then through an RFID signal module coupled to the transducer antenna and at step 408 the electrical current is directed through at least one powered element coupled to the transducer antenna. Steps 406 and 408 preferably occur substantially simultaneously. As can be seen in FIGS. 1 to 3, each powered element is separate and distinct from the power conditioning unit and the RFID signal module, and the transducer antenna, the powered element(s) and the RFID signal module form part of a passive RFID transponder with the powered element(s) coupled to the transducer antenna in parallel with the power conditioning unit and the RFID signal module. As such, the flow of electrical current from the transducer antenna to the powered element(s) bypasses the RFID signal module and the power conditioning unit.

Certain types of powered elements may be considered as powered indicators, in the sense that activation of the powered element provides a detectable indication of receipt of an RF signal by a passive RFID transponder circuit of which the powered element forms a part. In some cases, the indication is one that can be perceived directly by a human user. For example, an LED or other light source that emits light in the visible spectrum is a powered indicator, as is a speaker emitting sounds in the human-audible range. A switch driven by voltage from the transducer antenna, such as the switch 340 in FIG. 3, is also a powered indicator because it produces a detectable change in condition. This change in condition may be directly detected electronically by a secondary circuit 350, or indirectly, for example by the change in condition of the switch 340 triggering a human-perceptible signal, such as an audible or visible signal, from the secondary circuit 350.

Figure 5:
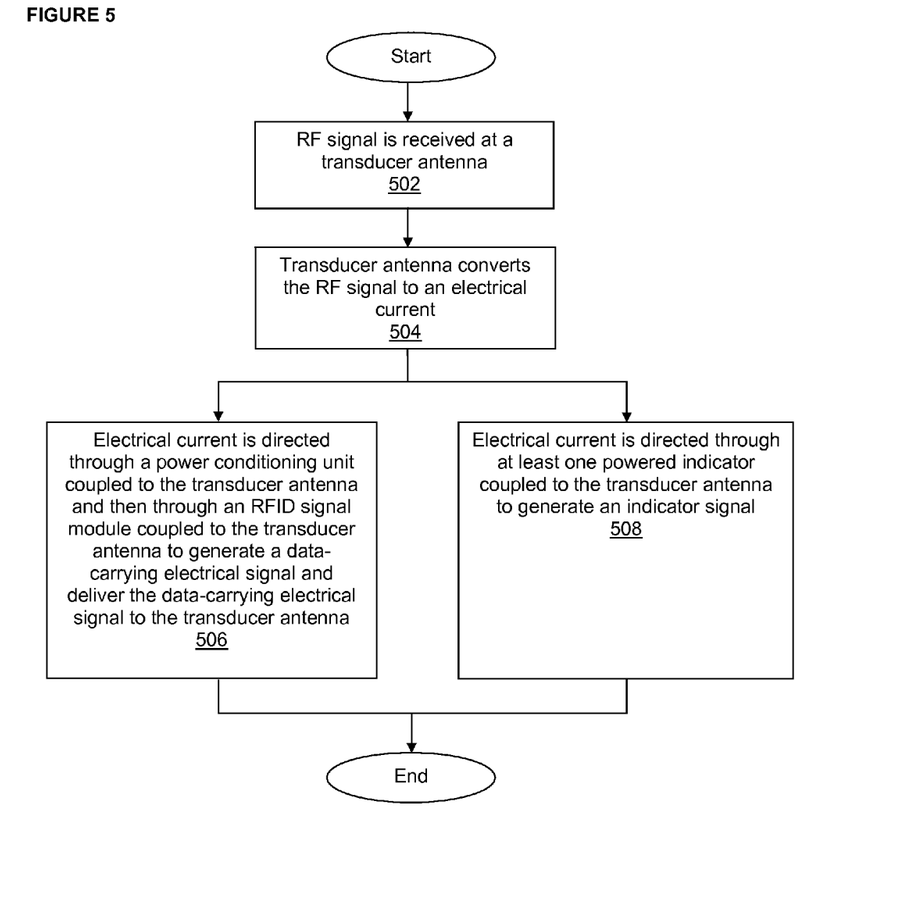
FIG. 5 is a flow chart showing an exemplary method for indicating receipt of an RF signal by a passive RFID transponder.

FIG. 5 is a flow chart showing an exemplary method 500 for indicating receipt of an RF signal by a passive RFID transponder. The method 500 may be carried out, for example, using any of the exemplary passive RFID transponder circuits 100, 200, 300 shown in FIGS. 1 to 3, respectively. At step 502, an RF signal is received at a transducer antenna and at step 504 the transducer antenna converts the RF signal to an electrical current. At step 506 the electrical current is directed through a power conditioning unit coupled to the transducer antenna and then through an RFID signal module coupled to the transducer antenna to generate a data-carrying electrical signal and deliver the data-carrying electrical signal to the transducer antenna. At step 508 the electrical current is directed through at least one powered indicator coupled to the transducer antenna to generate an indicator signal. Preferably, steps 506 and 508 occur substantially simultaneously, and the electrical current through the power conditioning unit and the RFID signal module flows in parallel with the electrical current through the powered indicator(s) and the flow of electrical current from the transducer antenna to the powered indicator bypasses the RFID signal module and the power conditioning unit. As shown in FIGS. 1 to 3, each powered indicator is separate and distinct from the power conditioning unit and the RFID signal module, and the transducer antenna, the powered indicator(s), the power conditioning unit and the RFID signal module form part of a passive RFID transponder.

Figure 6A:
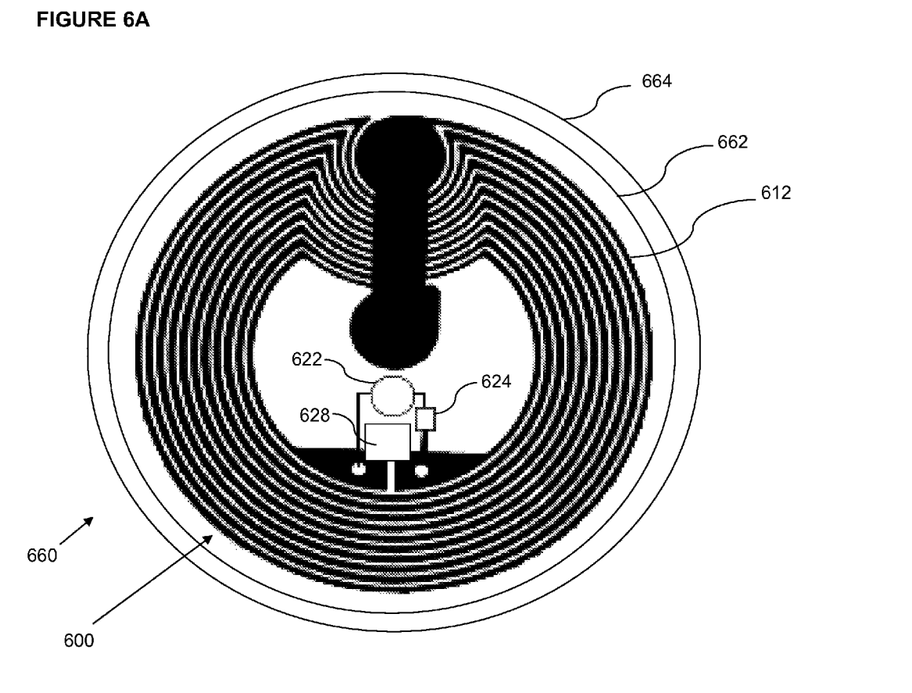
FIG. 6A is a plan view of a first exemplary NFC tag.
Figure 6B:
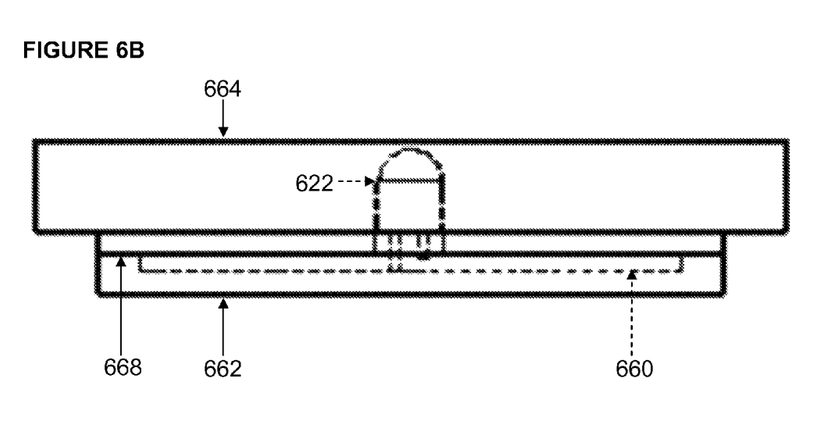
FIG. 6B is a side elevation view of the NFC tag of FIG. 6A.
Figure 7A:
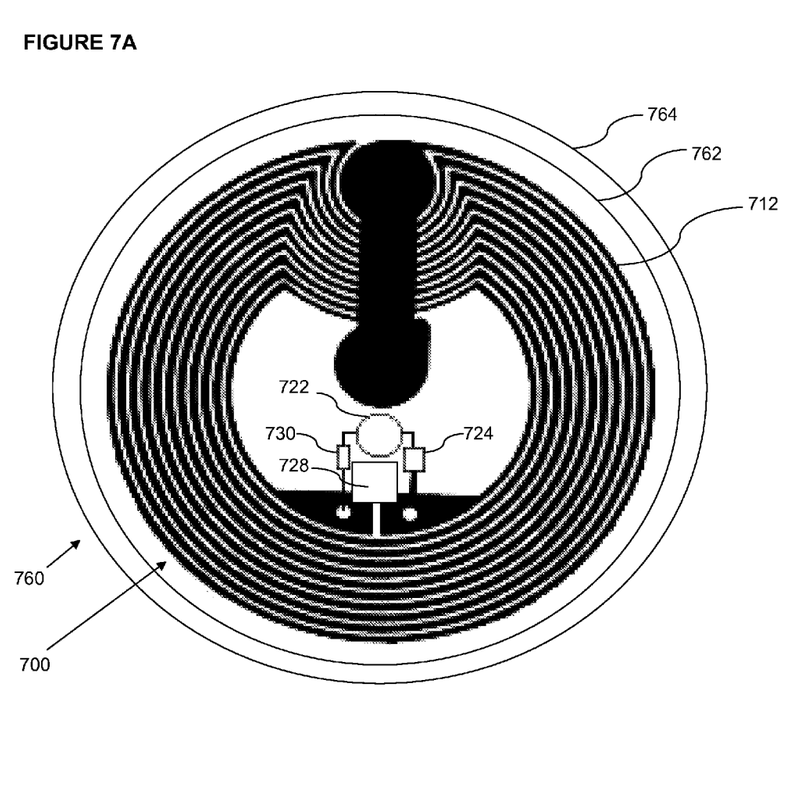
FIG. 7A is a plan view of a second exemplary NFC tag.
Figure 7B:
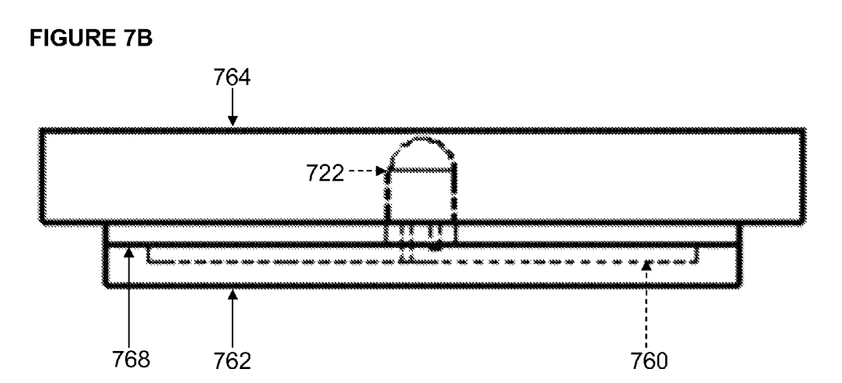
FIG. 7B is a side elevation view of the NFC tag of FIG. 7A.

Reference is now made to FIGS. 6A and 6B, which show a first exemplary passive RFID transponder in the form of a near field communication (NFC) tag 660. The NFC tag 660 comprises a disc-shaped polyvinylchloride (PVC) casing 662 in which is encased the transducer antenna 612 and an integrated circuit 628 containing both the power conditioning unit and RFID signal module of a passive RFID transponder circuit 600 of the type shown in FIG. 1 and including an LED 622 and resistor 624. The LED 622 extends beyond the casing 662. Because the passive RFID transponder circuit 600 is part of an NFC tag 660, the transducer antenna 612 is tuned to a frequency of 13.56 MHz and the RFID signal module in the integrated circuit 628 is compliant with applicable standards governing NFC devices. The NFC tag 660 further comprises a disc 664 formed from a clear or translucent optical carrying medium, that is, a material that will transmit light, with an isolation layer 668 (FIG. 6B) formed from an anti-metal or ferrite material, interposed between the transducer antenna 612 and the disc 664. The LED 622 extends through the isolation layer 668 and is embedded in the disc 664, which in one preferred embodiment is formed from a translucent acrylic material for dispersing light. As such, when RF signals from a reader device (not shown in FIGS. 6A and 6B) are received by the transducer antenna 612, the LED 622 will emit light which will be diffused by the translucent material of the disc 664. FIGS. 7A and 7B show a second exemplary NFC tag 760 which is identical to the first NFC tag 660 except that the transponder circuit 700 is of the type shown in FIG. 2 and further comprises a pulse controller 730; as such like reference numerals refer to like features but with the prefix "7" instead of "6".

In some embodiments, a passive RFID transponder circuit of the type shown in FIG. 1 or 2 may be encased in a wristband formed at least in part of flexible, translucent material, so that when RF signals from a reader device are received by the transducer antenna, the LED will emit light that is diffused by the translucent material so as to cause at least a portion of the wristband to glow. Alternatively, a passive RFID transponder circuit of the type shown in FIG. 3 may be used, with the secondary circuit comprising a plurality of spaced-apart LEDs encased in the flexible, translucent material of the wristband along with an independent power source, so that receipt of RF signals by the transducer antenna will throw the switch and activate the LEDs in the secondary circuit to illuminate the wristband.

Figure 8:
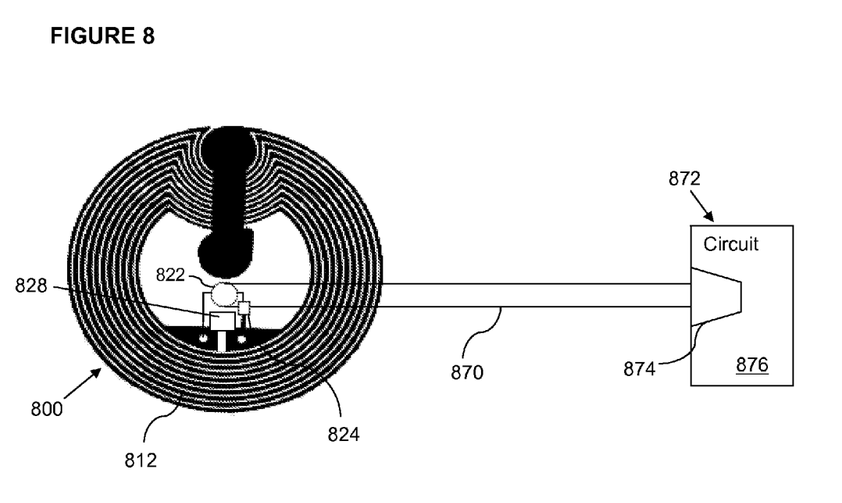
FIG. 8 is a plan view of an exemplary RFID transponder communicating with another circuit by way of an optical fiber.

FIG. 8 shows an exemplary passive RFID transponder comprising an RFID transponder circuit 800 of the type shown in FIG. 1, including a transducer antenna 812, an integrated circuit 828 containing a power conditioning unit and an RFID signal module, a resistor 824 and an LED 822 which communicates with an optical fiber 870 for transmitting light from the LED 822 to another location 872. For example, the optical fiber 870 may transmit light from the LED 822 to a photoreceptor 874 located remotely from the LED 822 and forming part of another circuit 876.

Although the exemplary embodiments show only a single LED, in other embodiments a plurality of LEDs, or other suitable light sources, may be used. Moreover, the powered element need not be coupled directly to the transducer antenna, but may be coupled thereto indirectly, for example with one or more intervening components as shown in the drawings.

Several embodiments have been described by way of example. It will be apparent to persons skilled in the art that a number of variations and modifications can be made without departing from the scope of the claims.

What is claimed is:

1. A passive RFID transponder circuit, comprising:
   a transducer antenna adapted to receive incoming RF signals and convert the incoming RF signals into electrical current, the transducer antenna further being adapted to receive a data-carrying electrical signal and convert the data-carrying electrical signal into an outgoing data-carrying RF signal;
   an RFID signal module coupled to the transducer antenna in an electrical circuit therewith; and
   a power conditioning unit interposed in the electrical circuit between the transducer antenna and the RFID signal module and configured to receive electrical current from the transducer antenna and deliver conditioned electrical current to the RFID signal module;
   the RFID signal module being arranged to receive the conditioned electrical current from the power conditioning unit and being adapted to respond to receiving the conditioned electrical current by transmitting the data-carrying electrical signal to the transducer antenna; and
   at least one powered element coupled to the transducer antenna in parallel with the RFID signal module and the power conditioning unit;
   wherein:
   the RFID transponder circuit is configured so that the at least one powered element receives electrical current from the transducer antenna to power the powered element; and
   flow of the electrical current from the transducer antenna to the at least one powered element to power the at least one powered element bypasses the RFID signal module and the power conditioning unit.

2. The passive RFID transponder circuit of claim 1, wherein the at least one powered element comprises at least one light source.

3. The passive RFID transponder circuit of claim 2, wherein:
   a pulse controller is interposed in the electrical circuit between the transducer antenna and the at least one light source, the pulse controller configured so that electrical current from the transducer antenna is stored by the pulse controller without reaching the at least one light source and then sent by the pulse controller to the at least one light source to pulse the at least one light source.

4. The passive RFID transponder circuit of claim 2, wherein at least one resistor is interposed in the electrical circuit between the transducer antenna and the at least one light source.

5. The passive RFID transponder circuit of claim 1, wherein the at least one powered element comprises a switch.

6. The passive RFID transponder circuit of claim 1, wherein:
   the passive RFID circuit is part of a near field communication tag; and
   the transducer antenna is tuned to a frequency of 13.56 MHz.

7. The passive RFID transponder circuit of claim 2, wherein the at least one light source is embedded in an optical carrying medium.

8. The passive RFID transponder circuit of claim 7, wherein the at least one light source communicates with an optical fiber for transmitting light from the light source to another location.

9. The passive RFID transponder circuit of claim 7, wherein the optical carrying medium is translucent for dispersing light.

10. The passive RFID transponder circuit of claim 1, wherein the power conditioning unit and the RFID signal module form part of a single integrated circuit.

11. A method for powering a powered element, comprising:
- receiving an RF signal at a transducer antenna;
- the transducer antenna converting the RF signal to an electrical current; and
- directing the electrical current through a power conditioning unit coupled to the transducer antenna and then through an RFID signal module coupled to the transducer antenna and also directing the electrical current through at least one powered element coupled to the transducer antenna to power the at least one powered element;

wherein:
- the at least one powered element is coupled to the transducer antenna in parallel with the power conditioning unit and the RFID signal module;
- flow of the electrical current from the transducer antenna to the at least one powered element to power the powered element bypasses the RFID signal module and the power conditioning unit; and
- the transducer antenna, the at least one powered element, the power conditioning unit and the RFID signal module all form part of a passive RFID transponder.

12. The method of claim 11, wherein the at least one powered element comprises a switch.

13. The method of claim 11, wherein the at least one powered element comprises at least one light source.

14. A method for indicating receipt of an RF signal by a passive RFID transponder; comprising:
- receiving an RF signal at a transducer antenna;
- the transducer antenna converting the RF signal to an electrical current;
- directing the electrical current through a power conditioning unit coupled to the transducer antenna and then through an RFID signal module coupled to the transducer antenna to generate a data-carrying electrical signal and deliver the data-carrying electrical signal to the transducer antenna; and
- directing the electrical current through at least one powered indicator coupled to the transducer antenna to power the at least one powered indicator to generate an indicator signal;
- wherein the electrical current through the power conditioning unit and the RFID signal module flows in parallel with the electrical current through the at least one powered indicator; and
- flow of the electrical current from the transducer antenna to the at least one powered indicator to power the at least one powered indicator bypasses the RFID signal module and the power conditioning unit.

15. The method of claim 14, wherein the at least one powered indicator comprises a switch.

16. The method of claim 14, wherein the at least one powered indicator comprises at least one light source.

* * * * *